INVENTORS
Elmer H. Hemmerle, John W. Sadler
and Stephen N. Tower.
BY
ATTORNEY

United States Patent Office 3,240,678
Patented Mar. 15, 1966

3,240,678
PRESSURE TUBE NEUTRONIC REACTOR AND COOLANT CONTROL MEANS THEREFOR
Elmer H. Hemmerle, Irwin, Pa., John W. Sadler, Las Vegas, Nev., and Stephen N. Tower, Murrysville, Pa., assignors to Westinghouse Electric Corporation, Pittsburgh, Pa., a corporation of Pennsylvania
Filed Aug. 22, 1963, Ser. No. 303,825
19 Claims. (Cl. 176—50)

The present application is a continuation-in-part of application, Serial No. 116,217, filed April 28, 1961, entitled "Neutronic Reactor," assigned to the present assignee and now abandoned.

The present invention relates to heterogeneous reactors and more particularly to a pressure tube reactor of this category adapted for superheating steam or other working fluid, or in general for use with a gaseous or liquid cooling medium.

For the most part, previously proposed reactor plants have employed a neutronic reactor which is capable of producing only saturated steam or other working fluids. When employed in known forms of thermodynamic machinery for converting the latent energy of the steam into electricity, saturated steam turbines have to be employed, the initial cost of which is higher than those turbines designed for operation with dry steam. Moreover, the use of saturated steam as a motivating fluid results in over-all plant efficiencies in the neighborhood of 25 to 28%, whereas the use of superheated steam produces plant efficiencies in the neighborhood of 31 to 40%. It has, of course, been proposed to add a fossil fueled superheater to the nuclear reactor plant. Such addition, however, militates against one purpose of employing nuclear energy, namely the conservation of fossil fuels for applications other than central power or heat generation, which applications involve areas where shielding is impractical or the total expenditure of energy is too small to justify the use of nuclear power generators in their presently known forms. Many examples of such applications are immediately apparent, for example the heat sources of private homes and other relatively small buildings and the use of fossil fuels for the production of drugs and chemical building materials, and for small motive engines.

The present invention therefore is directed to a neutronic reactor adapted for cooling by steam whose inlet conditions are saturated, or in other words a reactor which is cooled by steam in order to impart a predetermined degree of superheat thereto. The superheater reactor is particularly designed for use in a dual reactor plant in which steam is produced under saturated conditions by means of a conventional or known form of reactor. With this arrangement the thermal output of the superheater not only is used more efficiently but that of the saturated steam reactor as well.

It is well known that a neutronic reactor is arranged for extracting heat from a chain reaction or self-propagating fissioning process induced in a mass of fissionable isotopes such as $U^{233}$, $U^{235}$, $Pu^{239}$ and $Pu^{241}$. In order to breed additional fissionable isotopes, one or more of the fissionable isotopes mentioned above are combined with a fertile material such as uranium 238 or thorium 232. In neutronic reactor plants these two classes of materials, viz., fissionable and fertile isotopes, are referred to herein generically as fissile or nuclear fuel materials or isotopes. The mass of fissile material or nuclear fuel material is supported in various arrangements within or adjacent to a mass of moderator material employed to slow the normally fast neutrons emitted in the fissioning process to thermal velocities whereat the neutrons are most efficient in propagating the chain reaction. Suitable neutron absorbing control members are inserted into the mass of fissile material in order to control the chain reaction. During operation of the reactor, heat is transferred to the moderator material both directly from the fissile material and as a result of neutronic irradiation. Accordingly, means must be provided for removing heat from the moderator material; and if the reactor coolant is high pressure water, steam or other corrosive material and if the moderator is incompatible therewith, means must be afforded for preventing contact between the reactor coolant and the moderator structure. In those reactor systems where water or steam is employed advantageously as the reactor coolant, the reactor system or at least parts thereof must be pressurized to a high degree in order to attain an adequate or efficient working temperature.

Certain of these problems are intensified in a superheater reactor wherein steam is employed as the sole reactor coolant. This is due to the facts that the steam has a lower heat transfer coefficient and thus a correspondingly larger volume thereof is required for adequate cooling and that the steam may be supplied to the reactor in differing degrees of dryness or with differing amounts of entrained moisture content. Additionally, the lesser density of the steam at usual working pressures minimizes the possibility of employing the steam coolant as the reactor moderator. Accordingly, a separate moderator material such as graphite, beryllia, or a separately contained liquid such as water or a suitable organic material, usually must be utilized.

In view of the foregoing discussion, an object of the present invention is the provision of a novel and efficient gas-cooled reactor, particularly one which is cooled by steam.

Another object of the invention is the provision of a novel and efficient superheater reactor.

Another object is the provision of novel reactor coolant preheating means adaptable for use with either a liquid or gaseous reactor coolant and associated in heat transfer relation with the moderator structure of the reactor.

Further objects are the provision of a dual reactor plant including a novel arrangement of a "saturating" and superheating reactor system and the provision of emergency shutdown cooling means for a reactor system.

Another object of the invention is the provision of a neutronic reactor having novel means associated therewith for cooling the moderator chamber thereof.

More specifically, it is an object of the invention to provide a reactor of the last named category in which the moderator material is a solid material.

Still another object of the invention is the provision of a steam cooled reactor having novel means associated therewith for initially drying the steam supplied thereto.

A further object of the invention is the provision of novel means in a steam cooled neutronic reactor for conserving heat developed in the moderator chamber of the reactor by employing this heat for drying the inlet steam.

Yet another object of the invention is the provision of a novel and efficient form of pressure tube neutronic reactor.

Another object of the invention is the provision of a pressure tube type reactor having a solid moderator in which novel means are afforded for directly cooling the outer surfaces of the pressure tubes such that lower cost structural materials can be employed therein and for additionally cooling the moderator structure.

Still another object of the invention is the provision in a pressure tube type reactor of novel and efficient sealing plug means and, orificing means for the individual pressure tubes thereof. More specifically, an object of the invention is the provision of such orificing means which can be readily operated from a remote location while the reactor is in operation.

These and other objects, features and advantages of the invention will be made apparent during the forthcoming description of illustrative modifications thereof with the description being taken in conjunction with the accompanying drawings, wherein:

In FIGURE 4 the sectional plane is rotated through a relatively small angle relative to FIGURE 1 so that the structural arrangement of the reactor when viewing FIGURES 1 and 4 together is made more apparent.

Figure 1:
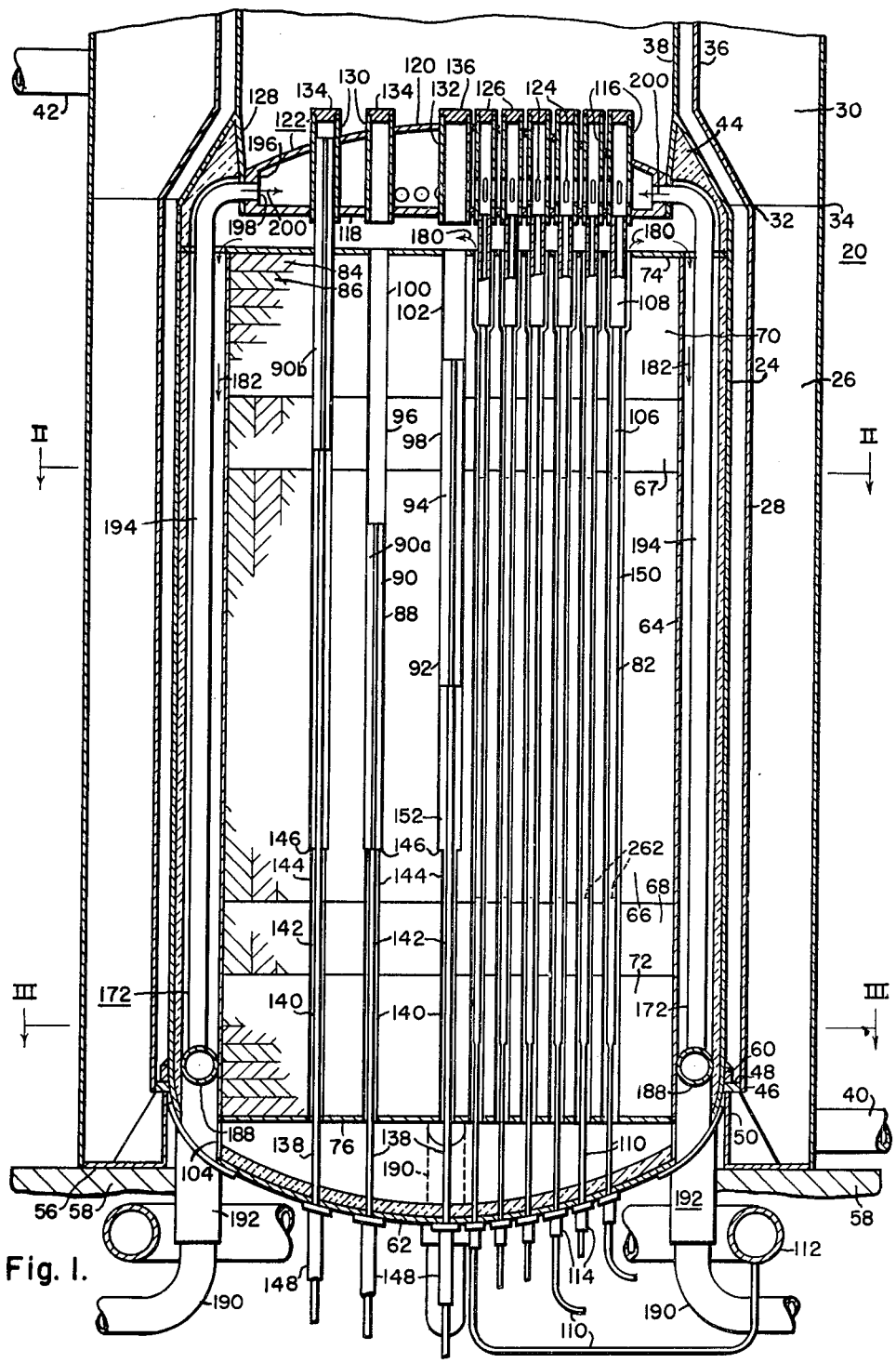
FIGURE 1 is a longitudinally sectioned view of one form of gas or steam cooled reactor constructed in accordance with the principles of the present invention.

In accordance with the invention, a gas-cooled neutronic reactor is provided which is especially adapted for cooling by saturated steam. A separate moderator structure is employed and means are provided for preventing the steam or other reactor coolants from contacting the moderator. Accordingly, the necessity of canning of the moderator material is obviated when a solid moderator material is employed. This is accomplished in one example by employing individual pressure tubes each containing a fuel element assembly and confining the reactor coolant to the interior of the tubes. This has the effect of segregating the coolant from the moderator material disposed outwardly of the tubes. In addition, the reactor coolant system can be pressurized without the provision of an expensive thick walled containment vessel. Coolant passages are extended through the solid moderator structure and adjacent the outer surfaces of the pressure tubes for circulating a moderator cooling medium to the moderator and to internal heat exchanging means for preheating the incoming gaseous coolant or in the case of steam for removing the last vestiges of moisture therefrom. Obviously, due to the use of a separate moderator structure either liquid or gaseous coolant can be employed in the novel reactor of the invention, either of which can be preheated as aforesaid. Alternatively, or in conjunction with the aforementioned moderator cooling arrangement, the internal heat exchanging means can be disposed adjacent the moderator structure to receive heat radiatively therefrom, since the latter is operated at elevated temperatures.

In the fabrication of a dual reactor plant, employing the aforementioned superheating or steam-cooled reactor some basic ground rules should be observed. Because of the initial expense involved, the dual reactor system should be limited to relatively large plants of 100 mw. (e) or larger. The superheating reactor of the dual reactor plant is supplied with saturated steam developed from a pressurized or closed cycle water reactor system. Obviously, however, saturated steam from any type of reactor or other heat source can be employed.

The use of a superheating reactor in this connection however raises some philosophical questions. In the case of a superheating reactor, as described more fully below, superheated steam which has been passed through the reactor is conveyed directly to the steam turbine or other thermodynamic machinery for the generation of electrical power. In the event of a fuel element failure within the superheating reactor the possibility exists, of course, that radioactive material from the fuel element will be entrained in the steam coolant and carried into the steam turbine. At first glance, then, it is difficult to justify the use of the closed cycle pressurized water reactor system for supplying the saturated steam, where separated primary coolant and steam systems are employed to prevent such radioactive carryover in the event of fuel element failure. It would seem that the boiling water reactor, in which the saturated steam is produced directly in the reactor core, is a more logical source of steam for the superheater reactor. There exists some argument however for use of the pressurized water reactor as a steam source. Although the superheater reactor normally should have negligible carryover of radioactive material because of the low solubility of metal and salts in dry steam, a non-radioactive source of steam would reduce the possibility of entraining radioactive material into the steam turbine while easing the maintenance problem connected with the superheating reactor.

Inasmuch as FIGURES 1 to 4, inclusive, differ only as to size, as determined by differing fuel inventories, these figures will be considered together. In these figures, a reactor 20 (FIGURE 1) or 22 (FIGURE 4) includes a relatively thin walled reactor vessel 24 surrounded by a biologically shielding tank 26. The tank 26 is of annular configuration or double walled construction and has an inner wall structure 28 spaced outwardly of the reactor vessel 24 in order to provide clearance for mounting the reactor within the shielding tank 26 as described below. Desirably the shielding tank 26 contains a neutron absorbing liquid such as boronated water. The top portion 30 of the shielding tank 26 is fabricated separately and is joined to the balance of the tank 26 by means of sealing and structural welds 32 and 34. The top portion 30 is added to the shielding tank 26, of course, after the remainder of the reactor components have been secured in place. The inner wall 36 of the shielding tank portion 30 is displaced inwardly in order to follow the outer contour of the top vessel shielding member 38 described hereinafter. For filling and draining the shielding tank 26 or for replenishing the shielding liquid therein outlet and inlet conduits 40 and 42, respectively, are provided.

In order to conserve the heat induced in the moderator structure, a layer of insulating material 44, such as steel wool is secured to the inner wall surface of the reactor vessel 24.

Adjacent the lower end of shielding tank 26, a stepped configuration 46 is afforded by means of supporting ring 48 seal welded at its outer periphery to the lower end of the inner tank shielding wall 28 and at its inner periphery to a tubular wall portion 40 of relatively smaller diameter than that of the wall section 28. The wall portion 50, which of course is seal welded to a bottom wall member 56 of the shielding tank 26, rests upon suitable concrete or other foundation structure denoted generally by the reference character 58. The reactor vessel 24 is supported upon the ring member 48 by engagement therewith of an annular band 60 which is structurally welded to the outer surface of the reactor vessel 24. The vessel 24 includes a spheroidal bottom wall member 62 of sufficient thickness to support the weight of the internal reactor components.

Mounted inwardly of the reactor vessel 24 and spaced therefrom is a moderator container 64. The container 64 is of generally right circular cylindrical configuration and contains the moderator 66 proper, the reflectors 67 and 68 disposed respectively at upper and lower extremities of the moderator 66 and upper and lower radiation shields 70 and 72 arranged adjacent but outwardly of the reflectors 67 and 68, respectively. The moderator container 64 is closed by upper and lower generally circular plates 74 and 76 which are suitably apertured for the passage of the pressure tubes and control members discussed below.

The moderator proper 66 is formulated from a closely packed array of elongated hexagonal solids 78, some of which solids 78′ have central longitudinally extending apertures 80 for the passage of pressure tubes 82 therethrough. The solid members 78 or 78′ can extend the height of the moderator 66 as viewed in FIGURES 1 and 4 or for ease of manufacture and handling they can be subdivided into two or more tandemly engaged sections (not shown). The reflector members 67 and 68 can be formed in the same manner from hexagonal blocks or alternatively can be supplied in layers or in a one-piece construction. The shielding regions 70 and 72 are substantially filled with alternating layers, in this example, of graphite 84 and carbon steel 86. The structures comprising the reflectors 67 and 68 and the shielding areas 70 and 72 likewise are suitably apertured for alignment with the moderator structure 66. Certain of the hexagonal members 78″ are peripherally notched as denoted by reference characters 88 in order to afford channels for the passage of Y-shaped control members 90. In this example, the central hexagonal member 78a is provided with a cruciform shaped channel 92 for the passage of a cruciform control member 94. For reasons hereinafter pointed out, similar Y-shaped and cruciform control member channels 96 and 98 respectively are formed in the upper reflector 67, which last-mentioned channels are aligned with the notches 88 and with the cruciform channel 92 of the moderator section 66 and with similar channels 100 and 102 of the upper shielding structure 70. As pointed out previously, the moderator container end plates 74 and 76 are suitably apertured for alignment with the adjacent shielding structures 70 and 72 respectively. The moderator tank 64 and the associated internal components are supported upon the spheroidal bottom wall 62 of the reactor vessel 24 by means of a short tubular supporting member 104.

A plurality of pressure tubes 82 extend in a generally parallel spaced array through the moderator structure 66 and the associated reflectors 67 and 68 and the shielding arrangements 70 and 72. Each of the pressure tubes 82 comprises a central section 106 which extends through the moderator section 66, the upper and lower reflectors 67 and 68 and into the upper and lower shielding arrangements 70 and 72 where it is joined to upper and lower connecting conduits 108 and 110, respectively. The lower connecting conduits 110 extend individually through the bottom wall 62 of the reactor vessel 24 to an associated ring header 112. At the points of their passage through the bottom wall 62 the lower connecting conduits 110 are joined thereto by means of known bellows type or expansional joints 114.

The upper tubular sections 108 are joined respectively to apertured inlet tubes 116. The tubular sections of each pressure tube 82 can be joined for example by annular seal welding at 109 (FIG. 6) at their respective junctions. The inlet tubes 116 pass through and are joined to a lower plate 118 and an upper spheroidal wall 120 comprising a stayed tube sheet 122. Each of the tubular sections 116 is provided with one or more inlet flow apertures 124, with four being employed in this example of the invention. Each of the flow apertures 124 communicates with the interior of the tube sheet 122 so that a coolant fluid supplied to the tube sheet 122 in turn can be directed into each of the pressure tubes 82. The outer open ends of the inlet tubes 116 are closed during operation of the reactor by plug members 126. Desirably a suitable orificing device is joined to each of the plug members 126, such as that orificing device disclosed or described in the copending application of Stephen N. Tower, entitled "Neutronic Reactor and Fuel Element Therefor," Serial No. 24,128, filed April 22, 1960, now U.S. Patent No. 3,211,623, issued October 12, 1965, and assigned to the present assignee; or alternatively the orificing device described hereinafter in connection with FIG. 6 can be utilized to advantage.

The joining of the inlet tubes 116 to the tube sheet components 118 and 120 greatly increases the resistance of the stayed tube sheet 122 to bending. Additionally, the strength of the tube sheet 122 is further increased by the arch effect of the spheroidal top wall 120. The stayed tube sheet 122 is supported within the reactor vessel 24 adjacent the top thereof by welding or bolting the outer periphery of the tube sheet to a downwardly extending supporting barrel 128, which is secured at its upper end to the reduced wall portion 38 of the reactor vessel 24. Similar stayed tubes 130 and 132 extend through the tube sheet 122 at positions respectively in alignment with the control rod channels 100 and 102 respectively, of the upper shield 70. The tubes 130 and 132 similarly are provided with plug members 134 and 136, respectively, to permit removal of the control rods 90 and 94 from the top of the reactor.

These control rods however are movable from the bottom of the reactor vessel 24 by means of control rod driving shafts 138. The shafts 138 are longitudinally movable through generally circular apertures 140 and 142 extending in alignment through the bottom shielding structure 72 and the reflector 68. Additionally, the restricted portions 144 of the control rod channels extend a short distance into the active core area or moderator sections 66 so that the control rods 90 or 94, when in their fully inserted or scrammed positions relative to the core area, are supported by engagement with shoulders 146 formed at the lower extremities of the widened control rod channel portions 88 and 92, as denoted by the position of control rod 90a. However, the length of the control rods 90 and 94 is selected such that when the rods are fully withdrawn from the active core region, as denoted by the position of control rod 90b, the control rods still are substantially enclosed within the reactor vessel 24 and the tube sheet 122. The control rods 90 or 94 are joined to their respective shafts by means of couplings such as that disclosed in a copending application of Erling Frisch, entitled "Control Rod Coupling for Nuclear Reactors," filed January 23, 1957, Serial No. 635,910, now U.S. Patent No. 3,107,209, issued October 15, 1963 and assigned to the present assignee.

The external portion of the shafts are aligned with the passages 140, 142 and 144 by means of shroud tubes, portions of which are denoted by reference character 148. Inasmuch as the reactor vessel 24 need not be pressurized to any great extent, conventional linear driving mechanism or components thereof (not shown) can be located within the shroud tubes 148 for moving the shafts 138.

Figure 3:
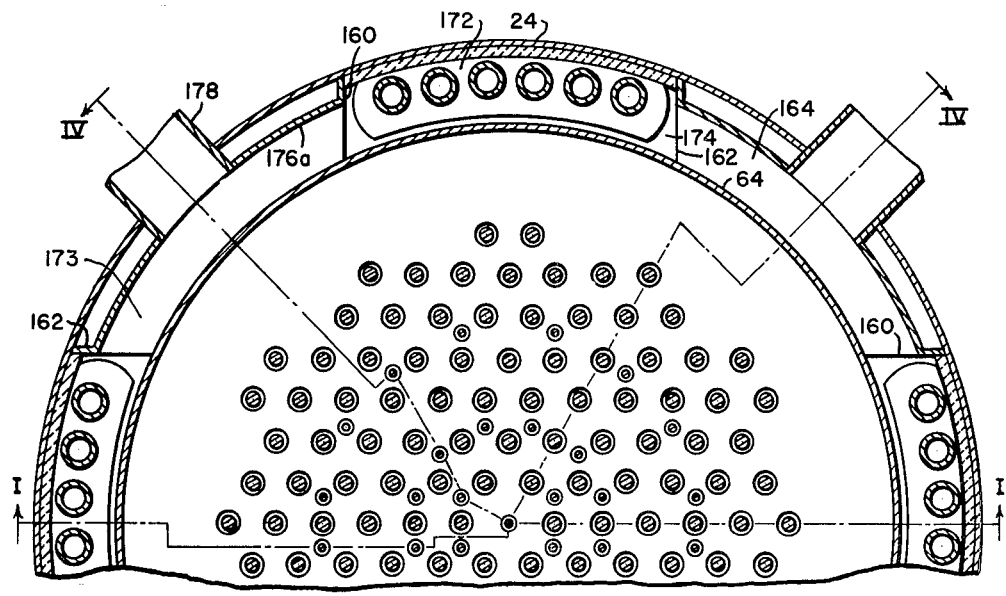
FIGURE 3 is another cross-sectional view of the reactor shown in FIGURE 1 but taken along reference line III—III thereof.

As is evident from the drawings, each of the pressure tubes 82 are positioned spacedly within their associated channels. Smaller clearances likewise surround the control rods 90 and 94 in their inserted positions. The annular areas 150 and 152 surrounding the pressure tubes 82 and the control rods 90 and 94 provide passages for a flow of a moderator cooling fluid longitudinally of the pressure tubes 82 and the control rods and associated components. Thus a relatively large number of moderator cooling flow passages extend longitudinally through the moderator tank 64 as better seen in FIG. 4. A suitable cooling fluid such as helium, carbon dioxide or nitrogen is supplied to the moderator cooling channels 150 and 152 through an inlet conduit 154. The incoming moderator cooling fluid is confined to the bottom area 156 of the reactor vessel 24 by means of a baffle member 158 extending between upright partitions 160 and 162 and the adjacent portions of the moderator tank 64 and the reactor vessel 24. Thus the baffle 158 is disposed horizontally and co-extends with the area designated by the reference character 164 as shown in FIG. 3, and the baffle 158 is further positioned just above the inlet conduit 154. As will be explained hereinafter, the incoming moderator cooling fluid is prevented from reaching the upper regions of the reactor vessel 24 by certain components of the reactor coolant preheating system presently to be described. As better shown in FIG. 4, the moderator cooling fluid enters the reactor vessel 24 through the inlet conduit 154 as designated by flow arrow 166. Hence, the moderator cooling fluid flows downwardly and inwardly to the individual entrances of the moderator cooling channels 150 and 152, as denoted by flow arrows 168 and 170, respectively.

Figure 2:
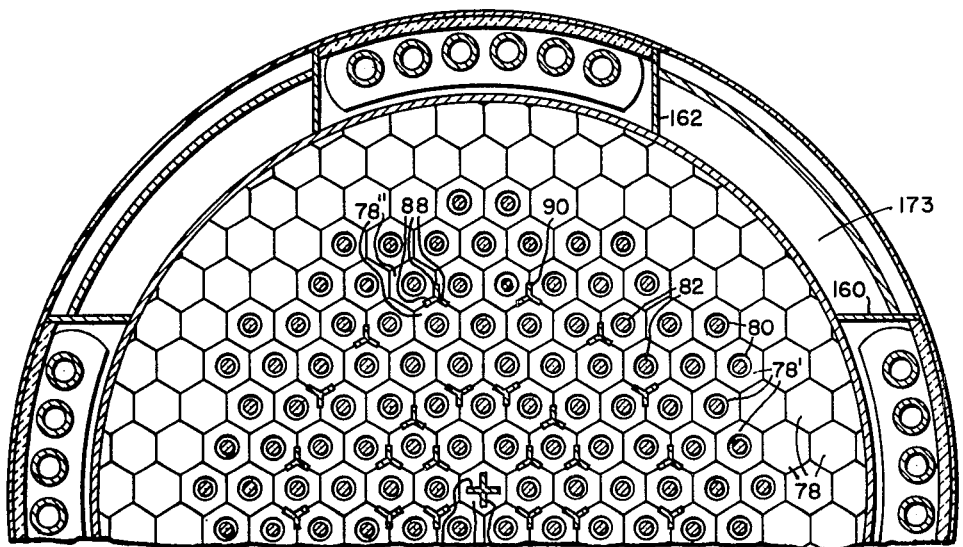
FIGURE 2 is a cross-sectional view of the reactor shown in FIGURE 1 and taken along reference line II—II thereof.
Figure 4:
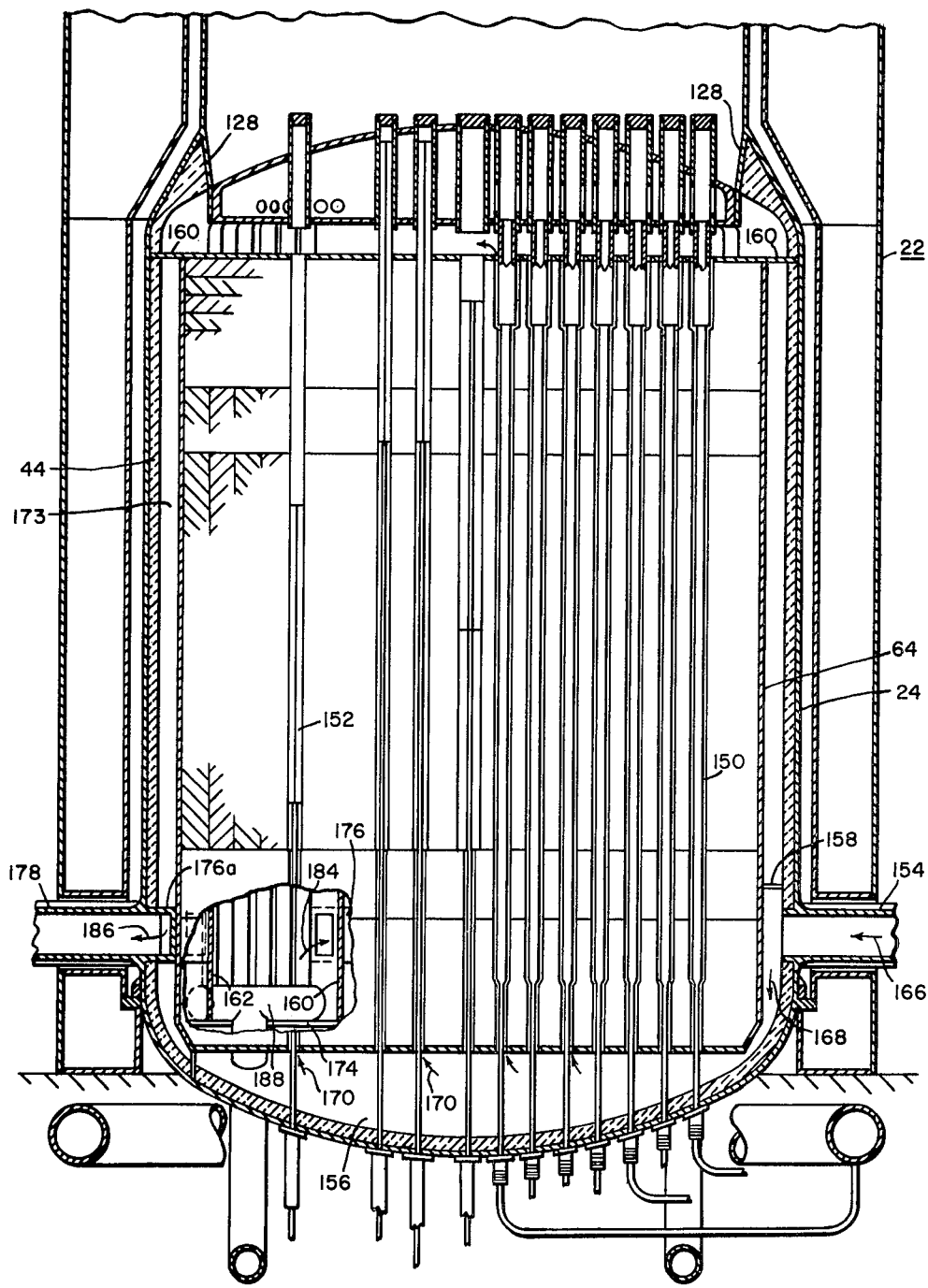
FIGURE 4 is a longitudinally sectioned view of a reactor constructed in accordance with the invention, which reactor is generally similar to that of FIGURE 1 except as to size.

As better shown in FIGS. 2 and 3 of the drawings, a plurality of pairs of the upstanding partitions 160 and 162 are extended vertically through an annular space 173 between the moderator container 64 and the reactor vessel 24. From FIG. 4 it will be seen that the length of each partition 160 or 162 coextends with the height of the moderator container 64. Each pair of the partitions 160 and 162 is arranged to enclose a preheater or heat exchanging means 172 therebetween. Inasmuch as the partitions 160 and 162 extend radially between the reactor vessel 24 and the moderator container 64, the side areas of the heat exchanging means 172 is completely enclosed to form a container therefor. The bottom of this container is enclosed by an arcuately formed horizontal strip 174, the ends of which are joined respectively to the adjacent partitions 160 and 162 and the sides to the adjacent portions of the reactor vessel 24 and the moderator container 64. The adjacent containers defined by the vertical partitions 160 and 162 are coupled by means of arcuately shaped conduit members 176, one of which, 176a, is connected to outlet conduit 178. The conduits 176 extend radially between the insulation 44 and the adjacent portion of the moderator container 64 so that that segment of the annular space 173 is divided horizontally by each conduit member 176. With this arrangement, the moderator cooling fluid issuing from the upper ends of the moderator cooling channels 150 and 152, as denoted by flow arrows 180, travels more or less radially to the aforementioned containers defined by the vertical partitions 160 and 162. Thence the moderator coolant descends through only those portions of the annular space 173 occupied by the heat exchanging means 172. Flow of the moderator coolant between those partitions 160 and 162 not occupied by a heat exchanging means 172 is prevented either by the aforementioned conduit members 176 or 176a or by the flow baffle 158 (FIG. 4). This downward flow is illustrated by flow arrows 182 (FIG. 1). Adjacent the bottoms of each of the containers containing the heat exchanging means 172, these downward flows are collected by means of the conduit members 176 and 176a (flow arrow 184) and exited to the outlet conduit 178 as indicated by flow arrow 186. The outlet conduit 178 is coupled to suitable pumping means for circulating the moderator cooling fluid in this manner and, if additional heat must be removed, to an external heat exchanger. Thence the moderator cooling fluid is returned to the inlet conduit 154 through suitably arranged piping (not shown).

Thus the moderator coolant issuing from the top of the container 64 is segregated from that entering the bottom thereof by means of the flow baffle 158 and by each of the conduit members 176.

The heat exchanging means 172 are arranged for removing at least part of the heat developed in the moderator structure of the reactor and thereby to utilize heat which otherwise would be lost to the moderator structure. This is accomplished by introducing the incoming reactor coolant fluid first through the heat exchanging means 172 and thence to the inlet ends of the pressure tubes 82 in the manner described subsequently. In the event that saturated steam is employed for the main reactor coolant, the heat exchanging means 172 serve to dry the incoming steam so that the last vestiges of moisture therein are removed.

Figure 5:
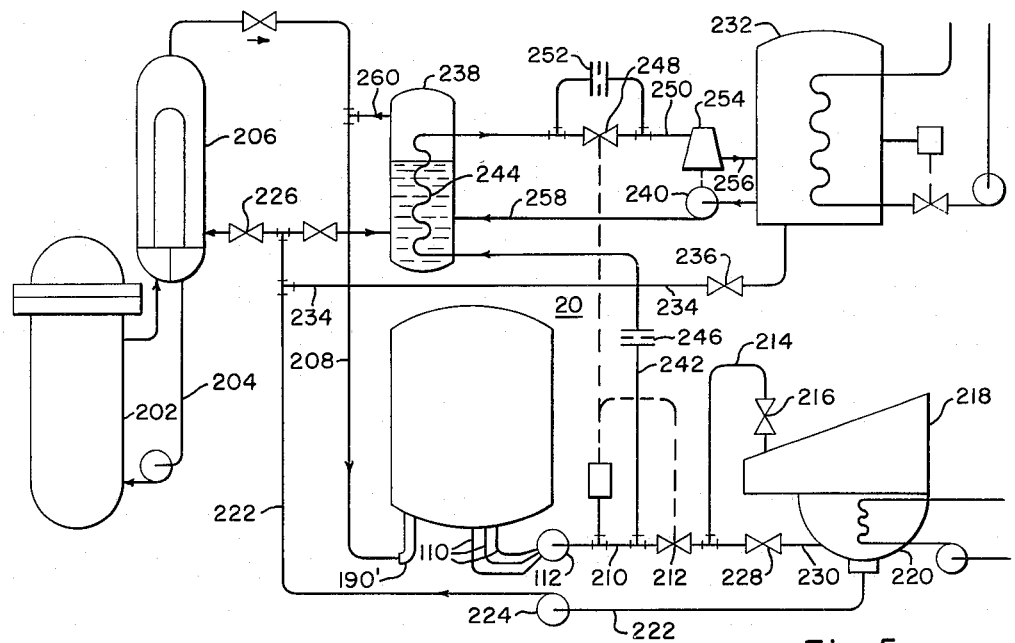
FIGURE 5 is a schematic fluid circuit diagram of a dual reactor plant, which in one application of the invention the reactor of FIGURE 1 or FIGURE 4 can be employed.

One form of heat exchanging means 172 includes a tubular manifold 188 located adjacent the bottom strip 174 of each container as defined by a pair of adjacent upright partitions 160 and 162. In this arrangement of the invention four such heat exchanging means 172 are employed, three of which are illustrated in FIGURES 1, 2 and 3 of the drawings. Each manifold 188 is coupled by means of a connecting conduit 190 to an external source of reactor coolant, for example individually to one of a plurality of primary coolant loops of a saturated steam generating reactor system. By connecting the manifolds 188 respectively to the saturated steam outlets of the steam generators of a conventional closed cycle water reactor or the like (one such generator 206 is shown in FIG. 5) a separate steam chest for combining the outlet steam is obviated and is replaced functionally by the stayed tube sheet 122. The conduits 190 exit through suitably placed apertures in the bottom wall 62 of a reactor vessel 24. Relative thermal expansion is afforded between the connecting conduits 190 and the bottom wall 62 as a result of the conduits being sealed thereto by means of conventional bellows type joints 192.

In the illustrated example, each of the manifolds 188 is coupled to the inlet stayed tube sheet 122 by a plurality of vertical heat exchanger tubes 194. The tubes 194 of each heat exchanging means extend in a generally parallel arcuate array so as to conform to the annular space 173 between the reactor vessel 24 and the moderator container 64. Adjacent the upper ends of the tubes 194, the latter are suitably bent for joining to the circumferential edge 196 of the tube sheet 122. The bundles of tubes 194 thus provide adequate transfer area for removing at least the major proportion of the heat developed in the moderator structure by contact with the moderator cooling fluid flowing downwardly between the moderator container 64 and the reactor vessel 24. By being disposed adjacent to the moderator container 64 the tubes 194 are advantageously disposed for receiving heat radiatively from the outer periphery of the moderator structure, as pointed out previously. From the upper openings 198 of the tubes 194, the incoming reactor coolant is conducted through the tube sheet 122 to the apertures 124 of the inlet tubes 116, as denoted by flow arrows 200. Thence the reactor coolant flows downwardly through the pressure tubes 82 and connecting conduits 110 and is collected by the outlet ring header 112.

With this arrangement, the reactor 20 is arranged not only for cooling by high temperature media, such as a gas or steam at elevated temperatures, but in addition the heat normally lost in the moderator structure is recovered. The importance of this latter function is realized when it is considered that 6 to 10% of the total thermal output of the reactor is developed in the moderator structure.

In selecting the design parameters for an exemplary application of the invention, the following table represents the results of calculations from which the optimum percentage enrichment and fuel to moderator ratio were selected:

*Table I.—Core characteristics*

| Pressure Tube Pitch, inches | Graphite Vol. (1.6 gm./cm.³) Equivalent Uranium Metal | Enrichment, percent | Resonance Escape Probability (P) | Thermal Utilization (f) | $\eta$-Fuel Region | Fast Effect (E) | Fermi Age $\tau$(cm.²) | Thermal Diff. Length $L^2$-cm.² | Non-Leakage Probability | Effective Multiplication, $K_{eff}$ |
|---|---|---|---|---|---|---|---|---|---|---|
| 14 | 120.9 | -------- | 0.8941 | 0.7942 | 1.661 | 1.015 | 402 | 356 | 0.9068 | 1.085 |
| 13 | 103.2 | -------- | 0.8772 | 0.8008 | 1.661 | 1.015 | 405 | 303 | 0.9061 | 1.073 |
| 12 | 86.8 | 3.5 | 0.8549 | 0.7931 | 1.619 | 1.015 | 408 | 268 | 0.9024 | 1.005 |
|  |  | 4.0 | -------- | 0.8070 | 1.661 | ------ | ------ | 254 | 0.9046 | 1.052 |
|  |  | 4.5 | -------- | 0.8194 | 1.696 | ------ | ------ | 240 | 0.9062 | 1.093 |
|  |  | 5.0 | -------- | 0.8296 | 1.727 | ------ | ------ | 230 | 0.9076 | 1.128 |
| 11 | 71.6 | 4.0 | 0.8257 | 0.8128 | 1.661 | 1.015 | 410 | 208 | 0.9018 | 1.020 |
| 10.5 | 64.6 | 4.0 | 0.8085 | 0.8154 | 1.661 | 1.015 | 411 | 188 | 0.8996 | 0.9999 |

On the basis of the foregoing tabulation a pressure tube pitch of 12 inches and an enrichment of 4.5% are employed, as indicated in Tables III and V, respectively.

As pointed out previously, the superheating reactor of the invention is adapted for use in conjunction with any saturated steam producing reactor. Although any saturated steam source can be employed, it is contemplated that a saturating steam reactor, for example the aforementioned pressurized or closed cycle water reactor, and the reactor of the invention be combined into a dual reactor plant. Such a plant is illustrated schematically in FIGURE 5 of the drawings. In the latter arrangement of the invention, saturated steam is produced in the saturating reactor system including a first reactor 202 and one or more primary circulating loops 204 each including a steam generator 206. Saturated steam from the generator 206 is conducted through conduit 208 to the connecting conduits 190 of the superheating reactor 20, one of which conduits is illustrated at 190' of FIGURE 5. From the conduits 190, saturated steam is conducted through and superheated in the reactor 20 in the manner described previously in connection with FIGS. 1 to 4 of the drawing. The superheated steam is conducted from the reactor 20 through the individual connecting conduits 110, three of which are illustrated in FIG. 5, which are coupled to the ring header 112. From the header 112 the superheated steam is conveyed through conduit 210, a normally open pressure sensitive valve 212, conduit 214 and through a normally opened turbine throttle valve 216 of a turbine 218.

The exhaust steam from the turbine 218 is conducted through an after condenser 220. From the condenser, feed water is returned to the saturating steam generator 206 through conduit 222, feed water pump 224 and normally open feed water valve 226. During times of low power demand or to compensate for excursions in the reactor 20, steam can be dumped directly to the after condenser 220 through normally closed by-pass valve 228 and conduit 230.

In the event of emergency shutdown, means must be afforded for removing decay heat from the superheating reactor 20. One arrangement for accomplishing this is to employ as a coolant the saturated steam developed from decay heat in the primary reactor system 202–206 when the latter also is in the shutdown condition. By disposing the steam generator 206 at an elevated position, thermal circulation is induced through the primary loop 204 and the reactor 202. With this arrangement, saturated steam is produced in the generator 206 until the feed water normally contained therein is evaporated. However, make-up feed water can be supplied to the generator 206, in the event of power failure, from an elevated reservoir tank 232 through conduit 234 and normally closed throttle valve 236. The tank 232 is of sufficient capacity to supply feed water in this fashion to the dual reactor plant for at least the first hour or until diesel operated pumps (not shown) or other emergency equipment can be started. The steam generated by the decay heat in this fashion of course is supplied through conduits 208 and 190 to the superheating or steam cooled reactor 20, as described previously.

However, for greater assurance that steam coolant medium will be available to the superheating reactor 20 to remove decay heat therefrom, a separate, emergency cooling system can be employed. Moreover, a failure in the superheating reactor 20 should not cause shutdown of the primary reactor system 202–206. When both reactors are shut down simultaneously, the decay heat of the primary reactor system will make enough saturated steam to supply the cooling means of the superheating reactor to remove decay heat therefrom. The decay heat versus time curves for the reactors 20 and 202 in most cases will be nearly identical based on percentage of reactor operating power.

The emergency superheating reactor cooling system includes a flash tank 238, the storage or heat sink tank 232, a turbine driven feed water pump 240 and associated conduit connection. During normal operation of the dual reactor system, a small amount of steam is bled continuously from the steam outlet line 210 of the superheating reactor through conduit 242 to a coiled heating tube or other heat exchange means 244 disposed within the flash tank 238. The amount of steam supplied in this manner is regulated by a flow controlling orifice 246 or a throttling valve (not shown). The steam supplied to the flash tank 238 in this manner is employed to maintain the water in the flash tank 238 at saturation temperature.

Upon reactors "scram," the pressure sensitive isolation valve 212 is closed while a normally closed valve 248 in an outlet steam conduit 250 of the flash tank 238 is opened. However, while the valve 248 is closed a pressure differential is maintained between the flash tank 238 and reservoir tank 232 by means of a steam bleed by-passing orifice 252.

Upon opening the valve 248, the pressure differential largely disappears such that the hot water within the tank 238 largely flashes to provide steam. Additional steam is afforded as a result of the additional heat supplied to the tank 238 when the isolation valve 212 is closed. This blow down steam is employed to drive turbine operator 254, which is coupled to the pump 240, and then is discharged into the heat sink tank 232, through conduit 256. Operation of the emergency feed water pump 240 then replaces the water leaving the flash tank 238 as steam, with the feed water being conveyed through the conduit 258.

Thus it is seen that the flash tank 238 initially operates as a steam generator as a result of the aforementioned blow-down, to supply saturated steam directly to the superheating reactor 20 through conduits 208 and 190 and the flash tank outlet conduit 260. However, the addition of cold water from the reservoir tank 232 gradually changes the flash tank 238 from a steam generator into a feed water heater. Thus, as the production of blow-down steam diminishes, hot water overflows the flash tank until it exits through the outlet conduit 260. The water in the flash tank 238 of course continues to be heated by the steam supplied to the heating coil 244 through the bleed conduit 242. At this point, assuming there is no production of steam in the primary reactor system 202–206, hot water is conveyed from the flash tank 238 directly to the heat exchanging means or steam dryers 172 of the superheating reactor 20 (FIGS. 1 to 4). In the heat exchangers 172, heat is supplied to the incoming hot water from the graphite moderator structure 66 in the manner described previously and the hot water begins to boil. The steam thus produced then leaves the dryer tubes and flows past the fuel elements 262 where it picks up the decay heat thereof. In this example, the fuel elements 262 are furnished as bundles of elongated fuel rods, desirably in the fashion described and claimed in the aforementioned copending application of S. N. Tower.

Subsequently, the emergency coolant leaves the superheating reactor by means of the conduits 110 and subsequently is conducted back to the flash tank 238 through the bleed conduit 242.

For the dual reactor plant described in connection with FIG. 5 of the drawings, some of the over-all plant parameters, in an exemplary application, can be tabulated as follows:

*Table II.—Dual reactor power plant*

| | |
|---|---|
| PWR reactor heat, mw. | 500 |
| Net electric, mw. | 144 |
| Auxiliary load, mw. | 11 |
| Plant O. A. efficiency, percent | 28.8 |
| S.H. reactor heat, mw. | 162 |
| Net electric, mw. | 79 |
| Auxiliary load, mw. | 1 |
| Plant O. A. efficiency, percent | 48.8 |
| Dual reactor heat, mw. | 662 |
| Net electric, mw. | 223 |
| Auxiliary load, mw. | 12 |
| Plant O. A. efficiency, percent | 33.7 |
| Steam Conditions: | |
|   PWR Steam Generator Outlet— | |
|     P.s.i.a. | 715 |
|     ° F. | 505 |
|   S. H. Inlet— | |
|     P.s.i.a. | 700 |
|     ° F. | 503 |
|   S. H. Outlet— | |
|     P.s.i.a. | 640 |
|     ° F. | 900 |
|   Turbine Inlet— | |
|     P.s.i.a. | 615 |
|     ° F. | 900 |
| Turbine-cycle efficiency, percent | 35.6 |
| Turbine heat rate, B.t.u./kw.-hr. | 9580 |

From the above tabulations, it can be seen that use of the superheating reactor 20 increases the over-all plant efficiency by approximately 5%. However, of the total heat added to the dual reactor system by the superheating reactor 20, approximately half can be converted into usable electricity. Moreover, inasmuch as the large circulating pumps usually associated with more conventional reactors, together with pressurizing systems and other auxiliary equipment, are eliminated, the auxiliary plant load which is attributable to the reactor 20 is only about 1½%. This figure reduces the dual reactor plant auxiliary load to about 5%, as compared to approximately 7½% for the primary reactor system 202–206.

With reference again to FIGS. 2 to 4 of the drawings, an exemplary superheating reactor 22 constructed in accordance therewith can be provided with the mechanical thermal and hydraulic characteristics, shown in the following Tables III and IV:

*Table III.—Mechanical characteristics*

| | |
|---|---|
| Reactor vessel outside diameter, ft. | 20 |
| Reactor vessel shell thickness, in. | 0.625 |
| Reactor vessel length (approx.), ft. | 31 |
| Number of steam inlet connections | 4 |
| Inlet line diameter, in. | 12 |
| Number of pressure tubes | 180 |
| Pressure tube pitch (triangular array), in. | 12 |
| Pressure tube O.D., in. | 3.23 |
| Pressure tube wall thickness, in. | 0.115 |
| Pressure tube P/D ratio | 3.72 |
| Number of fuel rods per pressure tube | 37 |
| Fuel rod active length, ft. | 12 |
| Fuel rod O.D., in. | 0.335 |
| Clad thickness, in. | 0.015 |
| Pellet diameter, in. | 0.300 |
| Diametral He gap, in. | 0.005 |
| Fuel rod pitch, array, in. | 0.440 |
| Fuel rod P/D ratio | 1.314 |
| Control rod length, ft. | 9 |
| Number of control rods | 38 |
| Number of drier tubes | 24 |
| Diameter of drier tubes, in. | 5 |

*Table IV.—Thermal and hydraulic characteristics*

| | |
|---|---|
| Total heat output, B.t.u./hr. | $5.53 \times 10^8$ |
| Coolant inlet temperature, ° F. | 503 |
| Coolant outlet temperature, ° F. | 900 |
| Average coolant temperature rise, ° F. | 397 |
| Coolant rise hot channel factor | 2.62 |
| Heat flux hot channel factor | 4.73 |
| Film drop hot channel factor | 5.67 |
| Hot channel outlet temperature, ° F. | 962 |
| Heat transfer surface area, ft.$^2$ | 7,710 |
| Average heat flux, B.t.u./hr.-ft.$^2$ | 71,725 |
| Maximum heat flux, B.t.u./hr.-ft.$^2$ | 339,260 |
| Typical film coefficient, B.t.u./hr.-ft.$^2$ ° F. | 800 |
| Maximum fuel rod surface temp., ° F. | 1264 |
| Maximum fuel rod center temp., ° F. | 4300 |
| Coolant flow rate, lb./hr. | $2.14 \times 10^6$ |
| Coolant flow area, ft.$^2$ | 4 |
| Core pressure drop, p.s.i. | 43.8 |
| Hot channel velocity, ft./sec. | 240 |

The over-all core characteristics of the reactor 22 are seen in the following tabulation:

*Table V.—Core characteristics*

Fractions of Core Volume:
1. Fuel section—
   a. $UO_2$    .021
   b. SS    .004
   c. Steam    .031
   d. Void    .0007

.0567

2. Gas Annulus    .01728
3. Pressure Tube    .00902
4. Graphite Moderator    .9170

Total    1.00000

Core Weight:
  $UO_2$ (4.5% enrichment), lbs.    27,000
  SS-type 316, lb.:
    Clad    4,000
    Pressure tube, lbs.    9,500

13,500

Graphite Moderator, Bare Core, No Reflector, lb.    187,000
Moderator to fuel ratio (volume)    85:1

From the foregoing table, it is seen that a moderator to fuel ratio by volume of 85 to 1 is employed in this example. This ratio is not critical but, on the contrary, is desirably selected for the purpose of assuring a relatively low initial enrichment together with the most advantageous percentage burn-up of the fissionable isotope. From the following table, it will be seen that the optimum moderator to fuel ratio occurs in the neighborhood of 75 or 85 to 1, insofar as the lowest possible initial enrichment is concerned:

sleeve 306 and in another bearing surface or guide 314, which is aligned with the sleeve 306. The guide 314 is mounted in a cup-shaped guide extension 316, which is threadedly secured to the lower end portion of the housing 300.

In this arrangement of the invention the orifice stem 310 is hermetically sealed to the housing 300 by means of a bellows seal 318, which is seal-welded to an inwardly extending, annular lip 320 formed at the lower end of the housing 300 and to an annular flange 322 secured to

*Table VI.—Results from Merlin analysis for various moderator to uranium volume ratios*

|  | 50/1 | | 75/1 | | 85/1 | | 100/1 | |
| --- | --- | --- | --- | --- | --- | --- | --- | --- |
|  | Cycle Loading | Uniform Loading | Cycle Loading | Uniform Loading | Cycle Loading | Uniform Loading | Cycle Loading | Uniform Loading |
| $p$ | 0.8542 | | 0.8905 | | 0.8977 | | 0.9104 | |
| E | 1.01705 | | 1.01705 | | 1.01705 | | 1.01705 | |
| $\tau$ | 393.8 | | 391.9 | | 391.6 | | 391.0 | |
| $B_2$ | 0.0001565 | | 0.0001274 | | 0.0001219 | | 0.0001124 | |
| Initial Enrichment (Percent) | 3.181 | 3.458 | 3.102 | 3.417 | 3.107 | 3.430 | 3.127 | 3.459 |
| Final Enrichment (Percent) | 2.122 | 2.400 | 1.999 | 2.311 | 1.993 | 2.312 | 1.991 | 2.320 |
| Plutonium Obtained: | | | | | | | | |
| (kg.) | 35.29 | 34.89 | 29.75 | 29.22 | 28.64 | 28.12 | 26.94 | 26.31 |
| w/o—240 | 16.49 | 15.71 | 18.79 | 17.63 | 19.20 | 17.99 | 21.34 | 19.74 |
| Initial Conversion Ratio | 0.4200 | 0.4092 | 0.3541 | 0.3413 | 0.3398 | 0.3267 | 0.3141 | 0.3009 |
| Percent Power from U-238 | 2.768 | 2.768 | 2.768 | 2.768 | 2.768 | 2.768 | 2.768 | 2.768 |
| Percent Power from U-235 | 74.40 | 74.98 | 77.71 | 78.39 | 78.50 | 79.24 | 79.94 | 80.76 |
| Percent Power from Pu | 22.83 | 22.25 | 19.52 | 18.84 | 18.73 | 17.99 | 17.29 | 16.47 |
| k initial, hot, clean | 1.0562 | 1.0892 | 1.0785 | 1.1196 | 1.0836 | 1.1261 | 1.0914 | 1.1359 |
| k initial, hot Xe and Sm | 1.0240 | 1.0558 | 1.0462 | 1.0858 | 1.0512 | 1.0923 | 1.0591 | 1.1020 |
| $F_Q$ (Beginning of Life) | 3.133 | 3.468 | 3.228 | 3.665 | 3.225 | 3.705 | 3.224 | 3.768 |
| $F_Q$ (End of Life) | 2.871 | 3.115 | 2.826 | 3.080 | 2.803 | 3.055 | 2.766 | 3.013 |

From the foregoing Table VI, coupled with Table I, the initial percentage enrichment and pressure tube spacing or pitch can be formulated with differing fuel to moderator ratios.

In the foregoing example, the superheating reactor 20 or 22 of the invention is moderated by graphite having a density of 1.51 grams per cubic centimeter. The aforedescribed moderator cooling system permits the graphite to operate at an average temperature of 1600° F. The higher operating temperature of the graphite permits a higher effective neutron temperature, which is equivalent to the moderator temperature multiplied by a factor of 1.23. It has been found that a higher effective neutron temperature decreases the shielding effect imparted to the reactor fuel elements by the pressure tube wall and other structural components of the reactor. Thus the deleterious effects of heterogeneity in the reactor core are partially offset.

Figure 6:
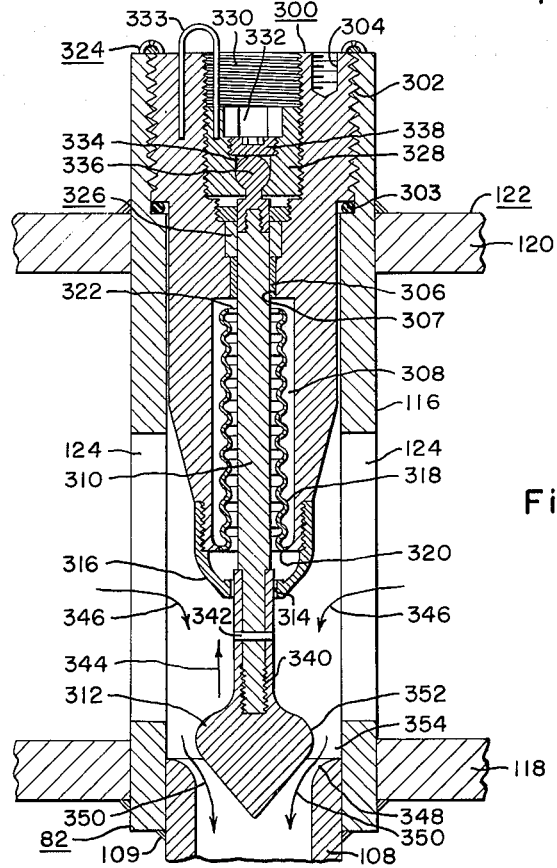
FIGURE 6 is an enlarged longitudinally sectioned view of an end portion of one of the pressure tubes employed in FIGURE 1 and showing orificing means arranged therefor in accordance with another feature of the invention.

Referring now to FIG. 6 of the drawings an exemplary form of the aforementioned plug means and orificing means is illustrated in accordance with the teachings of the present invention. In this arrangement the plug and orificing means is shaped for insertion into the otherwise open outer ends of the apertured inlet tubes 116, one of which, together with associated components of the stayed tube sheet 122 and the associated pressure tube 82, is shown enlarged in FIG. 6.

The plug and orificing means proper includes a plug and orifice stem housing 300 the outer end portion of which is externally threaded at 302 for engagement with the internally threaded end portion of the inlet tube 116. The housing 300 thus replaces the plug 126 illustrated in FIGS. 1 and 4 of the drawings. The housing 300 is sealed to the inlet tube 116 by an O-ring seal 303, and the outer end of the housing is provided with two or more tool engagement apertures, such as illustrated at 304, for insertion and removal of the plug-housing 300.

A bearing sleeve 306 or similar bearing surface is afforded at a constricted portion 307 of the central channel 308 extending through the housing 300. An orifice stem 310, terminating in a throttling plug 312, is mounted for longitudinal movement within the housing channel 308. In furtherance of this purpose, the orifice stem 310 is slidably mounted in the aforementioned bearing the orifice stem 310 adjacent the upper housing bearing 306. If desired, the housing 300 can be hermetically sealed at its upper or outer end to the adjacent end of the inlet tube 116 of the pressure tube 82 by means of a canopy type sealing weld of known construction denoted generally by the reference character 324.

Adjacent the upper end of the orifice stem 310 a conventional packing gland 326 is utilized to prevent entry of foreign matter into the housing 300 and to provide a secondary seal in the event of bellows rupture.

The orifice stem 310 is moved longitudinally through the housing 300 by means of a riser nut 328, which is joined to the orifice stem 310 by means of a ball and socket arrangement or the like presently to be described. The riser nut 328 is threadedly mounted in a recess 330 formed axially in the outer end portion of the housing channel 308. The depth of the threaded recess 330 is adequate to accommodate the anticipated range of movement of the orifice stem 310. Manipulation of the riser nut 328 is afforded by a hex-recess 332 in the upper surface thereof for insertion of a suitable remotely operated tool (not shown).

When not manipulated, the riser-nut 328 desirably is locked in position with an inverted U-shaped locking pin 333 inserted into longitudinally extending recesses therefor in the upper surfaces of the riser nut 328 and housing 300.

A hemispheroidal ball-socket 334 is formed adjacent the lower surface of the riser nut 328 and accommodates a ball-member 336, which is threadedly secured to the upper end of the orifice stem 310. The ball-socket 334 is closed with a plug-nut 338 threadedly engaging the riser nut 328 at the upper end portion of the ball-socket 334. The use of the ball and socket joint just decribed compensates for any slight misalignment of the bearings 306 and 314 with the path traveled by the riser nut 328 due to manufacturing tolerances or to unequal thermal strains introduced during operation of the reactor.

The aforementioned throttling plug 312 is secured to the lower end of the orifice stem 310 by a threaded sleeve and stud arrangement as denoted at the reference character 340 and by a locking pin 342 inserted through suitable apertures in the aforementioned sleeve and stud. When the orifice stem 310 is disposed at its lower-most position as illustrated in FIG. 6, it will be observed that clearance is intentionally provided between the lower, streamlined portions of throttling plug 312 and the adjacent rounded-off annular shoulder afforded by the upper end of the upper connecting conduit 108 forming part of the associated pressure tube 82. With this arrangement the adjustable orifice of the invention can never be inadvertently closed, which would, of course, result in meltdown of the fuel material contained within the pressure tube 82 thus affected. Thus from the position shown, the throttling plug 312 can only be moved upwardly as indicated by arrow 344 to its position of maximum flow (not shown). The flow of coolant through the adjustable orifice is illustrated by flow arrows 346, where it enters the flow slots 124 of the inlet tube 116, and flows downwardly through the annular orifice opening 348, as denoted by flow arrows 350, into the lower regions of the associated pressure tube 82. Of course as throttling plug 312 is drawn upwardly, its girth 352 passes the lower ends of the inlet slots 124 so that the latter have increasingly direct access to the annular orifice opening 348. Thus, the flow of coolant through the associated pressure tube is not necessarily limited by the dimensions of the annular clearance 354 existing between the throttling plug girth 352 and the inner wall of the associated inlet tube 116.

From the foregoing it is apparent that novel and efficient forms of nuclear reactor systems have been disclosed herein. The description and example given herein are intended to describe only an illustrative example of the invention and are not intended to be limitative thereof. Obviously, differing designs, parameters, and dimensions can be associated with the reactor of the invention depending upon the use and the power rating of the reactor. As indicated by the accompanying tables and as is well known to one skilled in the pertinent art, the thermal output of a given reactor design can be changed readily by the application of well known design formula. Certain examples of the non-criticality of neutronic reactor parameters are evident from the foregoing tables. It must be assumed that only a proper and workable selection of materials, parameters, and designs for a given reactor system will be made by the nuclear engineer and that sufficient knowledge is available to him so that he will summarily reject an unworkable scheme. In this respect, the office of the nuclear engineer is similar to that of a mechanical engineer, who, possessing the requisite skill in his field, will not employ improper materials, dimensions or tolerances in constructing a machine.

It is apparent from the foregoing description that certain features of the invention can be employed without other features thereof and that equivalent means can be substituted for the mechanical features of the invention. Moreover, it is to be understood that the superheating reactor 20 or 22 is not limited to cooling by steam alone but that other gases such as helium, carbon dioxide, or nitrogen can be employed in this respect. It is further contemplated that the reactor 20 or 22 can be used as a primary steam generator or boiling water reactor by supplying water to the inlet connections 190. This latter arrangement is advantageous in that most of the boiling will take place in the dryer tubes 194, so that the exit stream is superheated to some degree.

What is claimed is:
1. In a neutronic reactor, the combination comprising a vessel, a moderator structure spacedly mounted within said vessel, said vessel having an opening therein coextensive with a substantial portion of the adjacent surface of said moderator structure, a stayed tube sheet closure member closing said opening, said closure member including a pair of opposing spaced sheet members joined and sealed together at their peripheral edges to enclose a volume therebetween, a plurality of stay tubes passing through opposed pairs of apertures formed respectively in said sheet members, said stay tubes being joined and sealed to said sheet members at points of their passage therethrough, said moderator structure having a plurality of coolant flow passages extending therethrough, conduit means for coupling said stay tubes to said passages respectively, at least one fuel assembly mounted in each of said passages, a plurality of heat exchanging conduits disposed in the space between said moderator structure and the inner wall of said vessel and coupled for communication at their outlet ends with said closure member, said conduits being disposed in heat transfer relationship with said moderator structure, at least one flow opening in each of said stay tubes and communicating with the volume enclosed within said closure member, and means for circulating a fuel assembly cooling fluid through said heat exchanging conduits, said closure member, and said moderator passages.

2. In a neutronic reactor, the combination comprising a vessel, a moderator structure spacedly mounted within said vessel, said vessel having an opening therein coextensive with a substantial portion of the adjacent surface of said moderator structure, a stayed tube sheet closure member closing said opening, said closure member including a pair of opposing spaced sheet members joined and sealed together at their peripheral edges to enclose a volume therebetween, a plurality of stay tubes passing through opposed pairs of apertures formed respectively in said sheet members, said stay tubes being joined and sealed to said sheet members at points of their passage therethrough, a plurality of moderator coolant passages extending through said moderator structure, conduit means coupling said passages in communication with said stay tubes respectively, at least one fuel assembly mounted in each of said passages, a plurality of heat exchanging conduits disposed in the space between said moderator structure and the inner wall of said vessel and coupled for communication at their outlet ends with said closure member, at least one flow opening in each of said stay tubes and communicating with the volume enclosed within said closure member, said moderator structure having an additional number of moderator cooling flow openings extending therethrough and disposed adjacent said passages, said cooling flow openings communicating with the space between said moderator structure and said vessel, means for circulating a moderator cooling fluid through said cooling openings and said space and adjacent said heat exchanging conduits, and means for circulating a fuel assembly cooling fluid through said heat exchanging conduits, said closure member and said passages.

3. An emergency shutdown cooling system for a neutronic reactor, said system comprising a reactor vessel having inlet and outlet openings, means for supporting a plurality of fissile fuel elements within said vessel, said vessel having a number of coolant flow passages extending therethrough and communicating with said fuel elements when supported within said vessel and with said vessel openings, means for circulating a reactor coolant fluid through said openings and said flow passages to external heat utilizing means, a flash tank containing a quantity of volatile cooling liquid, heat exchanging conduit means disposed in said flash tank, a bleed conduit coupling said circulating means at a point between said vessel outlet opening and said heat utilizing means to said flash tank heat exchanging means, a second conduit coupling a vapor space within said flash tank to said vessel inlet opening, means for maintaining the liquid within said flash tank at its saturated conditions during reactor operation, and means for flashing the liquid in said flash tank to vapor upon shutdown of the reactor to provide coolant fluid to remove decay heat from the shutdown reactor.

4. An emergency shutdown cooling system for a neutronic reactor, said system comprising a reactor vessel having inlet and outlet openings, means for supporting a plurality of fissile fuel elements within said vessel, said vessel having a number of coolant flow passages extending therethrough and communicating with said fuel elements when supported within said vessel and with said vessel openings, means for circulating a reactor coolant fluid through said openings and said flow passages to external heat utilizing means, a flash tank containing a quantity of volatile cooling liquid, heat exchanging conduit means disposed in said flash tank, a bleed conduit coupling said circulating means at a point between said vessel outlet opening and said heat utilizing means to said flash tank heat exchanging means, a second conduit coupling a vapor space within said flash tank to said vessel inlet opening, a reservoir tank containing a quantity of said liquid, conduit means including a turbine-operated pump coupling said reservoir tank to said flash tank, and the outlet of said flash tank heat exchanging means being coupled to said turbine so that said pump is driven by the fluid exiting from said flash tank heat exchanging means to supply make-up liquid from said reservoir tank to said flash tank, whereby the liquid within said flash tank is maintained at its saturated conditions during reactor operation so that upon loss of coolant pressure upon shutdown of the reactor the liquid in said flash tank flashes to vapor to provide coolant fluid to remove decay heat from the shutdown reactor.

5. In a neutronic reactor, the combination comprising a vessel, a moderator structure spacedly mounted within said vessel, said vessel having an opening therein coextensive with a substantial portion of the adjacent surface of said moderator structure, a stayed tube sheet closure member closing said opening, said closure member including a pair of opposing spaced sheet members, means for joining and sealing said sheet members together at their peripheral edges to enclose a volume therebetween, a plurality of stay tubes passing through opposed pairs of apertures formed respectively in said sheet members, said stay tubes being joined and sealed to said sheet members at points of their passage therethrough, a plurality of reactor pressure tubes extending through said moderator structure in a generally parallel spaced array and being joined with the inner open ends of some of said stay tubes respectively, a plurality of control rod flow passages extending through said moderator structure, said passages being aligned respectively with the inner open ends of the remainder of said stay tubes, at least one fuel assembly mounted in each of said pressure tubes, a control rod mounted for movement in each of said passages, means for opening and closing the outer ends of said stay tubes so that said fuel assemblies can be removed respectively through said some stay tubes and said control rods can be removed respectively through said remaining stay tubes, a plurality of heat exchanging conduits disposed in the space between said moderator structure and the inner wall surface of said vessel and coupled for communication at their outlet ends with said closure member, at least one flow opening in each of said some stay tubes and communicating with the volume enclosed within said closure member, said moderator structure having a plurality of moderator cooling flow openings extending therethrough and disposed adjacent said pressure tubes, said cooling flow openings communicating with the space between said moderator structure and said vessel, means for circulating a moderator cooling fluid through said cooling openings and said space in heat transfer relationship with said conduits, and means for circulating a fuel assembly cooling fluid through said heat exchanging conduits, said closure member and said pressure tubes.

6. An emergency shutdown cooling system for a neutronic reactor, said system comprising a vessel, a moderator structure spacedly mounted within said vessel, heat exchanging conduit means disposed in the space between said structure and said vessel, a plurality of fissile fuel elements disposed in a lattice array within said moderator structure, said structure having a plurality of coolant flow openings extending therethrough and communicating with said fuel elements, means for coupling the outlet of said heat exchanging conduit means to said flow openings, said heat exchanging conduit means being in heat exchanging relationship with said moderator structure, means for circulating a reactor coolant fluid through said heat exchanging conduit means and said flow openings to external vapor utilizing means, a flash tank containing a quantity of volatile coolant liquid, additional heat exchanging conduit means disposed in said flash tank, a bleed conduit coupling said circulating means at a point between said flow openings and said vapor utilizing means to said flash tank heat exchanging means, a second conduit coupling a vapor space within said flash tank to the inlet of said first-mentioned heat exchanging means, a reservoir tank containing a quantity of said liquid, conduit means including a turbine operated pump coupling said reservoir tank to said flash tank, and the outlet of said flash tank heat exchanging means being coupled to said turbine so that said pump is driven by the vapor exiting from said flash tank heat exchanging means to supply make up liquid from said reservoir tank to said flash tank, whereby the liquid within said flash tank is maintained at its saturated conditions during reactor operation so that upon loss of coolant pressure upon shutdown of the reactor system the liquid in said flash tank flashes to vapor to provide coolant fluid to remove decay heat from the shutdown reactor system.

7. In a neutronic reactor, the combination comprising a vessel, a moderator structure supported within said vessel, a plurality of fissile fuel elements supported in a lattice array within said moderator structure, a first series of fuel cooling flow openings extending through said moderator structure and communicating with said fuel elements, a second series of moderator cooling flow openings extending through said moderator structure, the outer periphery of said moderator structure being spaced from the inner periphery of said vessel, heat exchanging means mounted within the space between said moderator structure and said vessel, means for coupling the outlet of said heat exchanging means to the inlet of said first series of flow openings, said second series of openings communicating with said space, means for circulating a moderator cooling fluid through said second series of openings and through said space in heat exchange relationship with said heat exchanging means, and means for circulating a fuel element cooling fluid through said heat exchanging means and through said first series of flow openings.

8. In a neutronic reactor, the combination comprising a vessel, a moderator structure disposed within said vessel, the outer periphery of said moderator structure being spaced from the inner periphery of said vessel, a plurality of flow openings extending through said moderator structure and communicating with the space between said structure and said vessel, a plurality of reactor pressure tubes extending through said openings respectively and being spacedly mounted therein, the spaces between said pressure tubes and said moderator structure communicating with the space between said structure and said vessel, heat exchanging means mounted in the space between said moderator structure and said vessel, the outlet of said heat exchanging means being coupled to the inlets of said pressure tubes, means for circulating a moderator cooling gas through said moderator structure spaces and through the space between said structure and said vessel in heat exchanging relationship with said heat exchanging means, and means for circulating a fuel assembly cooling vapor through said heat exchanging means and through said pressure tubes.

9. In a neutronic reactor, the combination comprising a vessel, a moderator structure spacedly mounted within said vessel, said vessel having an opening coextensive with a substantial portion of the adjacent surface of said moderator structure, a manifolding closure member enclosing said vessel opening, a plurality of reactor pressure tubes extending through said moderator structure in a spaced generally parallel array and communicating with said manifolding member, a plurality of heat exchanging conduits disposed in the space between said moderator structure and said vessel and communicating with said manifolding member, said heat exchanging conduits being disposed in heat transfer relationship with said moderating structure, at least one fuel assembly disposed in each of said pressure tubes, a plurality of moderator structure cooling flow openings extending therethrough and positioned adjacent said pressure tubes, said last-mentioned flow openings communicating with the space between said moderator structure and said vessel, means for circulating a moderator cooling fluid through said last-mentioned openings and said space in heat transfer relationship with said heat exchanging conduits, and means for circulating a fuel assembly coolant fluid through said heat exchanging conduits, said manifolding member, and said pressure tubes.

10. The combination of claim 9 wherein the inlet ends of said heat exchanging conduits are joined to manifolding means disposed in the space between said moderator structure and said vessel and said fuel assembly coolant fluid is saturated steam which is dried upon passing through said heat exchanging conduits, and further including conduit means extending through the adjacent wall portion of said vessel and communicating with said manifolding means.

11. In a neutronic reactor, the combination comprising a vessel, a moderator structure spacedly mounted within said vessel, said vessel having an opening coextensive with a substantial portion of the adjacent surface of said moderator structure, a manifolding closure member enclosing said vessel opening, a plurality of reactor pressure tubes extending through said moderator structure in a spaced generally parallel array and communicating with said manifolding member, a plurality of heat exchanging conduits disposed in the space between said moderator structure and said vessel and communicating with said manifolding member, said heat exchanging conduits being disposed in heat transfer relationship with said moderating structure, at least one fuel assembly disposed in each of said pressure tubes, the inlet ends of said heat exchanging conduits being joined to manifolding means disposed in the space between said moderator structure and said vessel, and conduit means extending through the adjacent wall portion of said vessel and communicating with said manifolding means, and means for circulating a coolant fluid through said conduit means, said heat exchanging conduits and said pressure tubes.

12. An emergency shutdown cooling system for a neutronic reactor, said system comprising a reactor vessel having inlet and outlet openings, means for supporting a mass of nuclear fuel material within said vessel, said mass having a number of coolant flow passages extending therethrough in heat exchanging relationship with said fuel material and in communication with said vessel openings, means for circulating a reactor coolant fluid through said openings and said flow passages to external heat utilizing means, a flash tank containing a quantity of volatile cooling liquid, heat exchanging conduit means disposed in said flash tank, a bleed conduit coupling said circulating means at a point between said vessel outlet opening and said heat utilizing means to the inlet of said flash tank heat exchanging means, a reservoir tank containing a quantity of said liquid and coupled to the outlet end of said flash tank heat exchanging means, means for supplying make-up liquid from said reservoir tank to said flash tank, a second conduit coupling a vapor space within said flash tank to said vessel inlet opening, means for maintaining the liquid within said flash tank at its saturated conditions during reactor operation, and means for flashing the liquid in said flash tank to vapor upon shutdown of the reactor to provide coolant fluid to remove decay heat from the shutdown reactor.

13. The combination of claim 12 including means for maintaining a substantial pressure differential between said flash tank and said reservoir tank during reactor operation, and means for reducing said pressure differential upon reactor shutdown so as to lower the pressure in said flash tank.

14. The combination of claim 13 including a normally opened first valve in said circulating means at a point between said bleed conduit and said heat utilizing means, a third conduit coupling the outlet of said flash tank heat exchanging means to said reservoir tank, a normally closed second valve in said third conduit so as to maintain a substantial pressure differential between said flash tank and said reservoir tank, means for closing said first valve and simultaneously opening said second valve upon reactor shutdown so as to reduce substantially the pressure in said flash tank, and orificing means in said third conduit bypassing said second valve for permitting a sufficient flow of reactor coolant fluid therethrough during reactor operation so as to maintain the liquid within said flash tank at saturated condition.

15. An emergency cooling system for heat-generating apparatus, such system comprising a container having inlet and outlet coolant openings, means for supporting heat-generating means within said container, said container having a number of coolant flow passage means extending therethrough in heat exchanging relationship with said heat-generating means and in communication with said container openings, means for circulating a cooling fluid through said container openings and through said flow passage means to external heat utilizing means, a flash tank containing a quantity of volatile cooling liquid, heat exchanging conduit means disposed in said flash tank, a bleed conduit coupling said circulating means at a point between said container outlet opening and said heat utilizing means to said flash tank heat exchanging means, a second conduit coupling a vapor space within said flash tank to said container inlet opening, a reservoir tank containing a quantity of said liquid, conduit means including a turbine-operated pump coupling said reservoir tank to said flash tank, and the outlet of said flash tank heat exchanging means being coupled to said turbine so that said pump is driven by the fluid exiting from said flash tank heat exchanging means to supply make-up liquid from said reservoir tank to said flash tank, whereby the liquid within said flash tank is maintained at its saturated conditions during operation of said heat-generating means so that upon loss of coolant pressure within said container the liquid in said flash tank flashes to vapor to provide coolant fluid to remove heat from said heat-generating means.

16. A neutronic reactor comprising a vessel, a moderator structure spacedly mounted within said vessel, heat exchanging conduit means disposed in the space between said structure and said vessel, a plurality of fissile fuel elements disposed in a lattice array within said moderator structure, said structure having a plurality of coolant flow passage means extending therethrough and communicating with said fuel elements, an adjustable orificing device mounted in each of said passage means and having a movable throttling plug member, means for moving said plug member longitudinally within said passage means, said passage means each having at least one inlet aperture in the wall thereof juxtaposed to said plug member, an annular orificing shoulder secured to said flow passage means and disposed between said fuel elements and said inlet aperture, said plug member being movable into and out of said orificing shoulder, means for coupling the outlet of said heat exchanging conduit means to said flow passage means, said heat exchanging conduit means being in heat exchanging relationship with said moderator structure, means for circulating a reactor cooling fluid through said heat exchanging conduit means and said flow passage means to external vapor utilizing means, a flash tank containing a quantity of volatile cooling liquid, additional heat exchange conduit means disposed in said flash tank, a bleed conduit coupling said circulating means at a point between said flow passage means and said vapor utilizing means to said flash tank heat exchanging means, a second conduit coupling a vapor space within said flash tank to the inlet of said first-mentioned heat exchanging conduit means, whereby the liquid within said flash tank is maintained at its saturated conditions during reactor operation so that upon loss of coolant pressure upon shutdown of the reactor the liquid in said flash tank flashes to vapor to provide coolant fluid to remove decay heat from the shutdown reactor.

17. An adjustably orificed pressure tube assembly for a neutronic reactor, said assembly including an elongated tube containing a mass of nuclear fuel material, an adjustable orificing device mounted in said tube and having a movable throttling plug member, said tube having at least one inlet aperture in the wall thereof juxtaposed to said plug member, an annular orificing shoulder secured to said tube and disposed between said nuclear fuel material and said inlet aperture, means for moving said plug member longitudinally into and out of said orificing shoulder whereby a fluid opening of regulatable area is formed between said plug member and said orificing shoulder, and an extensible means sealingly secured between said plug member and said tube, and means for circulating a coolant fluid through said inlet aperture, said orificing shoulder, and said tube.

18. An adjustably orificed pressure tube assembly for a neutronic reactor, said assembly including an elongated tube capable of containing a mass of nuclear fuel material, a hollow elongated plug and housing member tightly fitted within one end portion of said tube, an orifice stem mounted for longitudinal movement within said housing member, means operable from the outer end of said housing for moving said stem, a tapered plug member mounted on said stem adjacent the other end of said housing member, said tube having at least one inlet aperture in the wall thereof juxtaposed to said plug member, an annular rounded shoulder integrally formed in said tube and disposed between said nuclear fuel material and said inlet aperture, means for moving said plug member longitudinally into and out of said orificing shoulder whereby a fluid opening of regulatable area is formed between said plug member and said orificing shoulder, means for circulating a coolant fluid through said inlet aperture, said orificing shoulder, and said tube, an extensible means for sealing said stem to said housing member, and means for sealing said housing member to said one tube end portion.

19. The combination of claim 18 wherein said extensible means comprises a bellows concentrically spaced over said stem having one end sealably secured to said stem and having the other end sealably secured to said plug and housing member and further including locking means for positioning said plug member with respect to said annular shoulder.

References Cited by the Examiner
UNITED STATES PATENTS

| | | | |
|---|---|---|---|
| 1,698,826 | 1/1929 | Shaffer | 138—46 X |
| 1,831,713 | 11/1931 | Knowlton | 138—46 X |
| 1,835,610 | 12/1931 | Page | 122—35 X |
| 1,875,608 | 9/1932 | Huntemuller | 122—35 X |
| 2,388,512 | 11/1945 | Wunsch | 122—35 X |
| 2,832,733 | 4/1958 | Szilard | 176—52 |
| 2,848,404 | 8/1958 | Treshow | 176—44 |
| 2,975,118 | 3/1961 | Tognoni | 176—59 |
| 2,977,297 | 3/1961 | Evans et al. | 176—52 |
| 3,047,479 | 7/1962 | Young et al. | 176—60 |
| 3,085,959 | 4/1963 | Germer | 176—60 |
| 3,085,964 | 4/1963 | Ritz et al. | 176—60 |
| 3,108,938 | 10/1963 | Nettel et al. | 176—60 |
| 3,114,414 | 12/1963 | Judd | 176—65 |

CARL D. QUARFORTH, *Primary Examiner.*

REUBEN EPSTEIN, *Examiner.*